(12) United States Patent
Wilcox et al.

(10) Patent No.: US 7,007,187 B1
(45) Date of Patent: Feb. 28, 2006

(54) METHOD AND APPARATUS FOR AN INTEGRATED CIRCUIT HAVING FLEXIBLE-RATIO FREQUENCY DOMAIN CROSS-OVERS

(75) Inventors: Jeffrey R. Wilcox, Hudson, OH (US); Gad S. Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 09/608,159

(22) Filed: Jun. 30, 2000

(51) Int. Cl.
*G06F 1/04* (2006.01)

(52) U.S. Cl. .................................. 713/500; 713/600
(58) Field of Classification Search ............... 713/400, 713/500, 503, 600; 710/129, 260
See application file for complete search history.

(56) References Cited

U.S. PATENT DOCUMENTS

| | | | |
|---|---|---|---|
| 5,329,471 A * | 7/1994 | Swoboda et al. ...... 395/500.44 |
| 5,471,587 A * | 11/1995 | Fernando .................... 710/129 |
| 5,577,192 A * | 11/1996 | Niederer et al. ............ 395/507 |
| 5,596,756 A * | 1/1997 | O'Brien ....................... 713/340 |
| 5,623,673 A * | 4/1997 | Gephardt et al. ........... 710/260 |
| 5,640,573 A * | 6/1997 | Gephardt et al. ........... 713/340 |
| 5,781,765 A * | 7/1998 | Alexander ................... 713/400 |
| 5,862,373 A * | 1/1999 | Pathikonda et al. ........ 713/501 |
| 5,884,023 A * | 3/1999 | Swoboda et al. ............. 714/30 |
| 5,915,107 A * | 6/1999 | Maley et al. ................ 713/400 |
| 5,958,011 A * | 9/1999 | Arimilli et al. ............. 709/224 |
| 5,961,649 A * | 10/1999 | Khandekar et al. ......... 713/400 |
| 6,047,382 A * | 4/2000 | Maley et al. ................ 713/501 |
| 6,049,887 A * | 4/2000 | Khandekar et al. ......... 713/503 |
| 6,112,307 A * | 8/2000 | Ajanovic et al. ........... 713/400 |
| 6,115,827 A * | 9/2000 | Nadeau-Dostie et al. ... 713/503 |
| 6,128,758 A * | 10/2000 | Hall et al. ................... 714/727 |
| 6,131,173 A * | 10/2000 | Meirlevede et al. ........ 714/726 |
| 6,175,603 B1 * | 1/2001 | Chapman et al. ........... 375/354 |
| 6,263,448 B1 * | 7/2001 | Tsern et al. ................. 713/501 |
| 6,268,749 B1 * | 7/2001 | Fisch et al. ................. 327/147 |
| 6,349,392 B1 * | 2/2002 | Swoboda et al. ............. 714/30 |
| 6,522,985 B1 * | 2/2003 | Swoboda et al. ........... 702/117 |
| 6,760,392 B1 * | 7/2004 | Tan et al. .................... 375/354 |

FOREIGN PATENT DOCUMENTS

| | | | |
|---|---|---|---|
| JP | 357100758 A | * | 6/1982 |
| JP | 401166241 A | * | 6/1989 |
| JP | 402253738 A | * | 10/1990 |

OTHER PUBLICATIONS

MacKenzie et al., "A Separation Between Reconfiguable Mesh Models", IEEE 1993, pp. 84-88.*
Kim et al., "Impact of Cross-over Liners on Delay Time of Two Parallel Global Wires", IEEE 1999, pp. 53-56.*

* cited by examiner

*Primary Examiner*—Chun Cao
(74) *Attorney, Agent, or Firm*—Ami P. Shah

(57) ABSTRACT

A method and apparatus for a integrated circuit having flexible-ratio frequency domain cross-overs. In one embodiment, an integrated circuit has at least three cooperating frequency domains with variable operating frequencies. The integrated circuit includes cross-over logic to allow integral fraction ratio frequency domain cross-overs between more than one pair of frequency domains.

6 Claims, 10 Drawing Sheets

METHOD AND APPARATUS FOR AN INTEGRATED CIRCUIT HAVING FLEXIBLE-RATIO FREQUENCY DOMAIN CROSS-OVERS

BACKGROUND

1. Field

The present disclosure pertains to the field of integrated circuits. More particularly, the present disclosure pertains to integrated circuits having multiple clock domains and cross-over logic to allow different portions of such integrated circuits to operate in such different clock domains.

2. Description of Related Art

Some integrated circuits allow internal portions to operate faster than the integrated circuit communicates with other components. Such integrated circuits are often referred to as having different clock domains. As semiconductor fabrication improvements are made and various portions of the integrated circuit are fine tuned, it often becomes possible to operate internal portions of such integrated circuits at higher frequencies. However, changing the frequency at which the integrated circuit communicates with other components is typically more difficult because the other components may need to be altered as well.

Accordingly, providing flexible interfaces to allow different clocking domains to continue operating at different frequencies may be advantageous. Such flexible interfaces may allow many different frequencies to be used for an internal clock domain while still fitting within a single or a limited set of external configurations.

FIG. 1a illustrates one prior art integrated circuit 100. The integrated circuit 100 includes a core 120 that operates at a first frequency ($f_A$) and a bus interface 110 that operates at a second frequency ($f_B$). In this prior art processor, cross-over circuitry is used to implement integral fractional ratios of bus to core frequency (n/m). An integral fractional frequency ratio means that one frequency is n/m times the other frequency, where n and m are integers greater than zero. In this case, the bus frequency is n/m times the core frequency. Details of one prior art cross-over circuit are discussed in U.S. Pat. No. 5,471,587.

FIG. 1b illustrates another prior art integrated circuit 130. The integrated circuit of FIG. 1b includes three frequency domains. The first frequency domain 160 operates at the highest frequency ($f_A$). This highest frequency is twice the frequency of a second frequency domain 150 ($f_B$). Such straightforward 2:1 clock frequency crossings allows even higher performance for portions such as the integer arithmetic and logic unit of a microprocessor. The frequency of the first frequency domain 160, however, is directly tied to the frequency of the second frequency domain 150. Additionally, since high performance is often crucial in such an arrangement and because prior art cross-over circuitry for fractional clock domain interfaces may have significant performance penalties, such secondary clock domain crossings typically do not include complex domain crossing logic.

The system of FIG. 1b also includes a bus interface 140 that operates at a third frequency ($f_C$). The bus interface 140 may operate at one of a few integral fractional frequency ratios (n/m) to the second frequency domain 150. This single integral fractional ratio interface only allows two variable frequency domains. A variable frequency domain has an operating frequency that can be adjusted with respect to other frequency domains or held constant while the other domain operating frequencies change. The operating frequency for a variable frequency domain may be directly selectable or may be selected by changing a ratio which defines the operating frequency with respect to that of another frequency domain. In the system of FIG. 1b, the bus interface 140 is one variable frequency domain, and the combination of the fixed-ratio domains, the first frequency domain 160 and the second frequency domain 150, together forms a second variable frequency domain.

Accordingly, prior art integrated circuits, do not implement multiple flexible clock domain interfaces and/or do not have adequately flexible and high performance frequency domain cross-overs.

BRIEF DESCRIPTION OF THE FIGURES

The present invention is illustrated by way of example and not limitation in the figures of the accompanying drawings.

DETAILED DESCRIPTION

The following description provides a method and apparatus for an integrated circuit having flexible-ratio frequency domain cross-overs. In the following description, numerous specific details such as operating frequencies, domain frequency ratios, logic functions performed by various integrated circuit portions and logic partitioning/integration choices are set forth in order to provide a more thorough understanding of the present invention. It will be appreciated, however, by one skilled in the art that the invention may be practiced without such specific details.

The techniques described herein advantageously allow flexible clock domain interfacing. In some embodiments, a low latency, high bandwidth cross-over is provided. The high bandwidth nature of the cross-over used in some embodiments may render practical the implementation of integrated circuits having three or more frequency domains interfacing at integral fractional frequency ratios. Typical prior art cross-overs may not provide sufficient sustained bandwidth to allow multiple fractional frequency domain crossings. Some embodiments can handle any n/m ratio, with appropriate mask signals being generated on the fly. Such flexibility may also be important to allow multiple flexible fractional domain crossings so that a wide variety of different operating frequencies may be used for different integrated circuit domains.

As will be further discussed herein, some embodiments allow an integrated processor to interface with multiple different external buses, each having a limited fixed set of operating frequencies, and yet to also offer a wide variety of internal processing frequencies. Such an arrangement advantageously allows a processor manufacturer to gradually increase the internal processing performance without disturbing the external interface or while continuing to support a limited set of external interfaces. Flexible interfacing may also be advantageous for integration of numerous separate functions into a single integrated circuit.

Figure 1A:
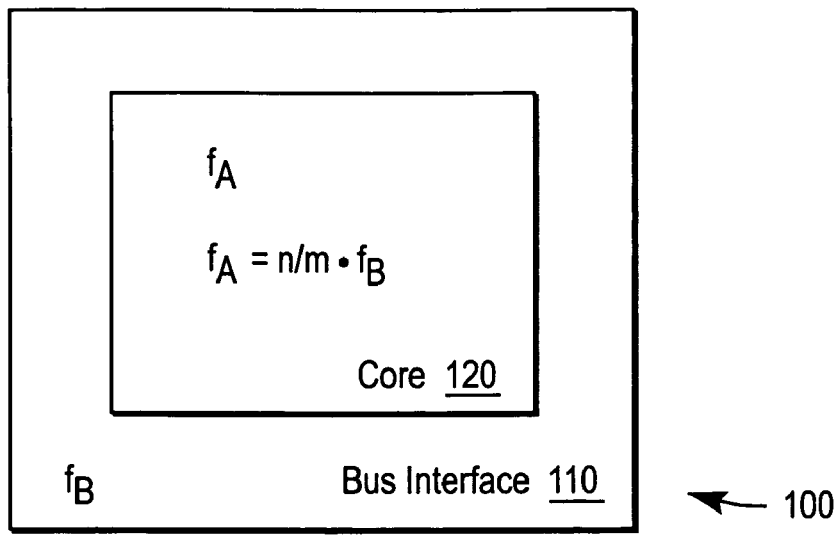
FIG. 1a illustrates a prior art processor with two frequency domains.
Figure 1B:
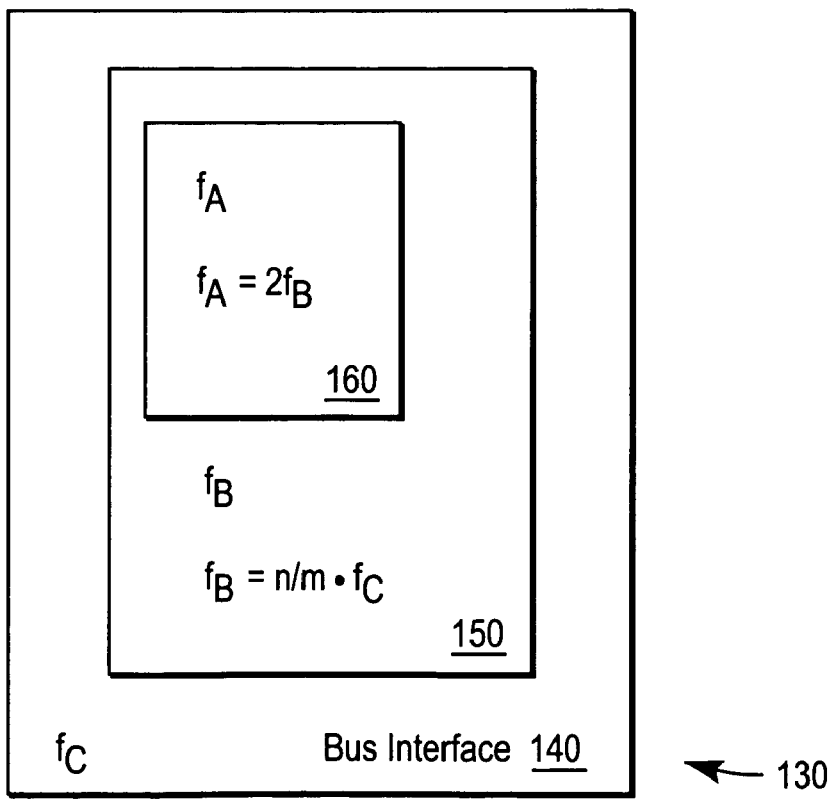
FIG. 1b illustrates a prior art processor with three frequency domains, with two of the frequency domains being set at a fixed ratio of operating frequencies.
Figure 2:
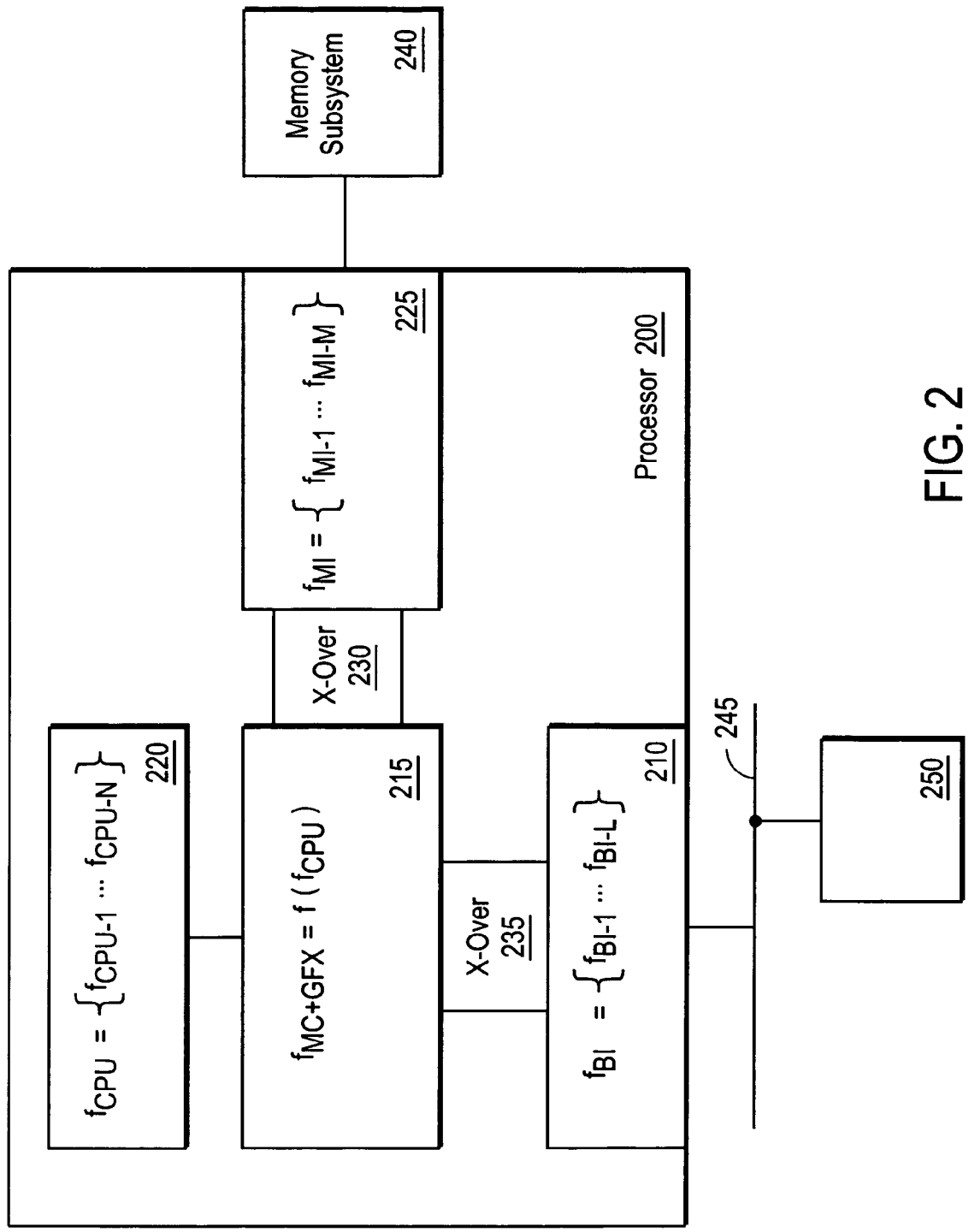
FIG. 2 illustrates one embodiment of a processor having multiple variable frequency domains.

FIG. 2 illustrates one embodiment of a processor 200 having three frequency domains. The processor 200 includes a memory interface domain 225 to interface with a memory subsystem 240. As illustrated, the frequency for the memory interface domain 225 is limited to a set of M memory interface frequencies ($f_{MI} = \{f_{MI-1} \ldots f_{MI-M}\}$). In other words, there may be a limited number of discrete frequencies at which the memory subsystem 240 operates and communicates. Thus, the processor 200 is constrained to include a frequency domain capable of communicating at one or more of these frequencies. In the illustrated embodiment, the memory interface domain 225 can operate at a variety of frequencies and therefore can communicate with memory subsystem 240 at a variety of frequencies. Notably, the memory interface domain 225 may operate at a different frequency than the signals transmitted between the memory interface domain 225 and the memory subsystem 240.

The processor 200 also includes a bus interface 210 to interface with a bus 245. I/O components or other components such as an I/O control hub 250 may be directly or indirectly coupled to the bus 245. The bus 245 may also have a limited set of operating frequencies. Consequently, the bus interface 210 has its own set of L operating frequencies ($f_{BI} = \{f_{BI-1} \ldots f_{BI-L}\}$). The limited set of frequencies typically corresponds to a set of common bus frequencies designated by multi-party or industry wide specifications to bus frequencies commonly used by existing or expected to be used in anticipated future products.

In the embodiment of FIG. 2, the processor 200 also includes a memory controller and graphics domain 215 and a central processor domain 220. The central processor domain 220 is operable and a set of N CPU frequencies ($f_{CPU} = \{f_{CPU-1} \ldots f_{CPU-N}\}$). The memory controller and graphics domain 215 has an operating frequency that is a function of the central processor operating frequency. For example, the memory controller and graphics domain 215 may have an operating frequency that is a fraction of or a multiple of the central processor operating frequency.

In order to facilitate communication between the various frequency domains, the processor 200 includes cross-over logic 230 and cross-over logic 235. Cross-over logic 235 provides an interface between the memory controller and graphics domain 215 and the bus interface 210. Cross-over logic 230 provides an interface between the memory controller and graphics domain 215 and the memory interface domain 225. In one embodiment, the cross-over logic provides deterministic signal crossing regardless of the particular frequencies chosen for the interfaced domains. The frequencies of the individual domains may be selected by choosing one or more absolute frequencies and/or by choosing a frequency ratio. The central processor domain 220 may communicate with the memory controller and graphics domain 215 via a bus interface similar to one used in prior art non-integrated devices (e.g., a separate processor and memory control hub communicate over a front side bus), or may instead use a cross-over circuit to achieve additional frequency options.

Figure 3:
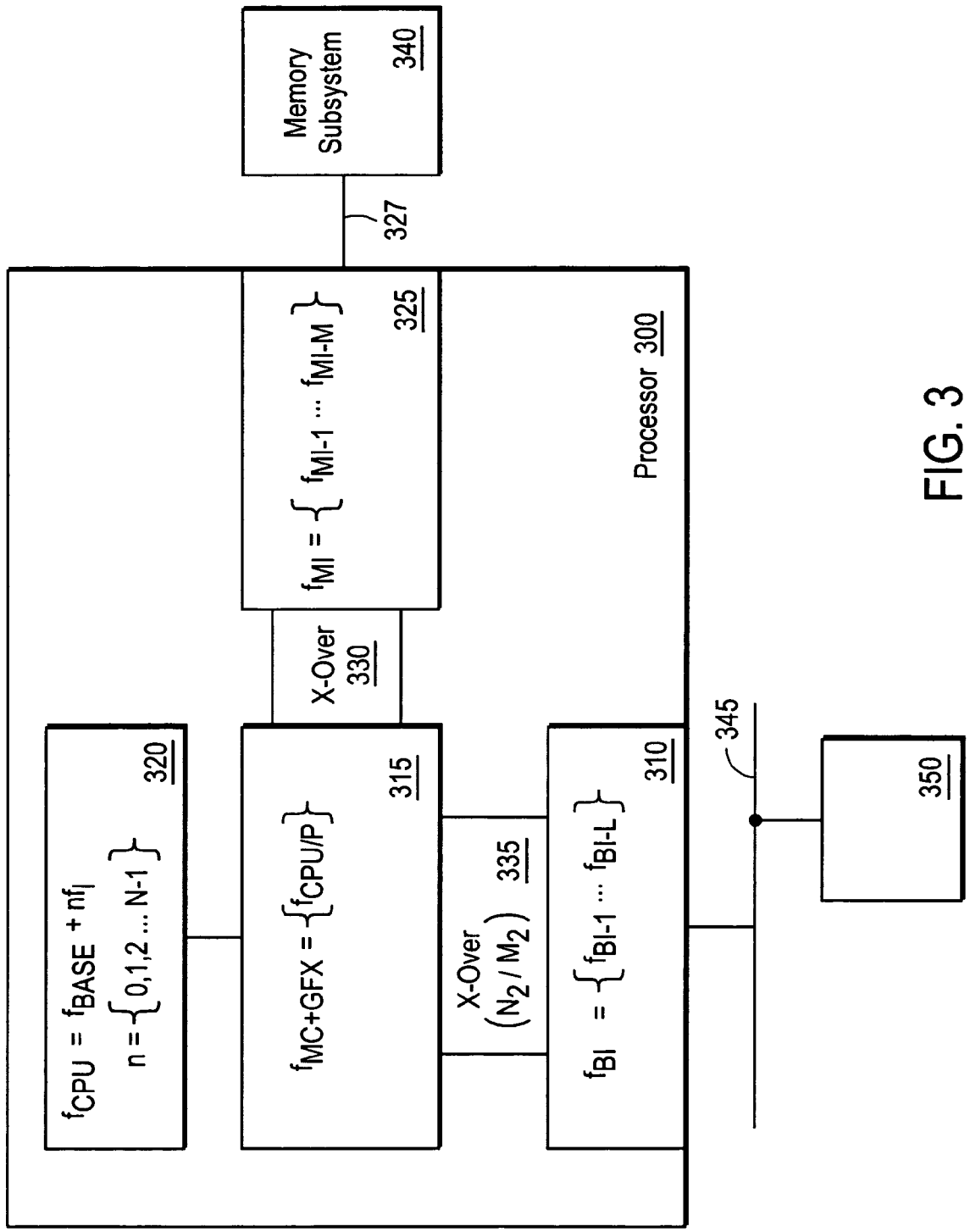
FIG. 3 illustrates another embodiment of a processor having multiple variable frequency domains.

FIG. 3 illustrates another embodiment of a processor 300 having multiple variable frequency domains. Similarly to the processor 200 in FIG. 2, the processor 300 includes a memory interface domain 325 to interface with a memory subsystem 340. In some embodiments, the memory interface domain 325 may operate at one-fourth the frequency of a clocking frequency for a clock-to-memory (CTM) clock used to synchronize transactions on a memory bus 327. Such an arrangement may be used when a Rambus™ memory subsystem is used. Other embodiments may use other known or otherwise available memory subsystems and may be clocked differently.

As illustrated in FIG. 3, the frequency for the memory interface domain 325 is limited to a set of M memory interface frequencies ($f_{MI} = \{f_{MI-1} \ldots f_{MI-M}\}$). The processor 300 also includes a bus interface 310 to interface with a bus 345. Again, I/O components or other components such as an I/O control hub 350 may be directly or indirectly coupled to the bus 345. The bus may also have a limited set of operating frequencies. Consequently, the bus interface has its own set of L operating frequencies ($f_{BI} = \{f_{BI-1} \ldots f_{BI-L}\}$) as previously discussed with respect to FIG. 2.

In the embodiment of FIG. 3, the processor 300 includes a memory controller and graphics domain 315 and a central processor domain 320. The central processor domain 320 is operable at a set of N CPU frequencies ($f_{CPU} = \{f_{CPU-1} \ldots f_{CPU-N}\}$). The CPU frequencies begin at a base frequency ($f_{BASE}$) and are equal to the base frequency plus an integral multiple of an incremental frequency ($f_1$). The memory controller and graphics domain 315 has an operating frequency that is an integral fraction of the central processor operating frequency ($F_{CPU}/p$). For example, the memory controller and graphics domain 215 may have an operating frequency that is one-third or one-fourth of the central processor operating frequency. In order to facilitate communication between the various frequency domains, the processor 300 includes cross-over logic 330 and cross-over logic 335 similar to that discussed with respect to FIG. 2.

One exemplary embodiment allows the following frequencies and frequency ratios. As referred to in the tables below, the clock-to-memory (CTM) frequency in the first row refers to the frequency of signal transmission with the memory subsystem. The memory interface domain 325 may operate at a fraction, such as one-fourth, of the CTM frequency. It will be apparent to one of skill in the art that other frequencies and frequency ratios may be used in other embodiments, particularly in view of the trend of ever increasing frequencies of operation for integrated circuits.

TABLE 1

Ratio of Graphics and Memory Control Domain Operating Frequency to Memory Interface Speed with Memory Interface Speed (CTM) at 400 MHz

| Core frequency | GFX + MC @ Core/3 GFX & MC frequency | CTM @ 400 MHz cross over ratio | GFX + MC @ Core/4, GFX & MC frequency | CTM @ 400 MHz cross over ratio |
|---|---|---|---|---|
| 467 | 156 | 9:14 | 117 | 12:14 |
| 500 | 167 | 9:15 | 125 | 12:15 |

TABLE 1-continued

Ratio of Graphics and Memory Control Domain Operating Frequency to Memory Interface Speed with Memory Interface Speed (CTM) at 400 MHz

| Core frequency | GFX + MC @ Core/3 GFX & MC frequency | CTM @ 400 MHz cross over ratio | GFX + MC @ Core/4, GFX & MC frequency | CTM @ 400 MHz cross over ratio |
|---|---|---|---|---|
| 533 | 178 | 9:16 | 133 | 12:16 |
| 567 | 189 | 9:17 | 142 | 12:17 |
| 600 | 200 | 9:18 | 150 | 12:18 |
| 633 | 211 | 9:19 | 158 | 12:19 |
| 667 | 222 | 9:20 | 167 | 12:20 |
| 700 | 233 | 9:21 | 175 | 12:21 |
| 733 | 244 | 9:22 | 183 | 12:22 |
| 767 | 256 | 9:23 | 192 | 12:23 |
| 800 | 267 | 9:24 | 200 | 12:24 |
| 833 | 278 | 9:25 | 208 | 12:25 |
| 867 | 289 | 9:26 | 217 | 12:26 |
| 900 | 300 | 9:27 | 225 | 12:27 |
| 933 | 311 | 9:28 | 233 | 12:28 |
| 966 | 322 | 9:29 | 242 | 12:29 |
| 1000 | 333 | 9:30 | 250 | 12:30 |

TABLE 2

Ratio of Graphics and Memory Control Domain Operating Frequency to Memory Interface Speed with Memory Interface Speed (CTM) at 356 MHz.

| Core frequency | GFX + MC @ Core/3 GFX & MCH frequency | CTM @ 266 MHz cross over ratio | GFX + MC @ Core/4, GFX & MCH frequency | CTM @ 266 MHz cross over ratio |
|---|---|---|---|---|
| 467 | 156 | 8:14 | 117 | 32:42 |
| 500 | 167 | 8:15 | 125 | 32:45 |
| 533 | 178 | 8:16 | 133 | 32:48 |
| 567 | 189 | 8:17 | 142 | 32:51 |
| 600 | 200 | 8:18 | 150 | 32:54 |
| 633 | 211 | 8:19 | 158 | 32:57 |
| 667 | 222 | 8:20 | 167 | 32:60 |
| 700 | 233 | 8:21 | 175 | 32:63 |
| 733 | 244 | 8:22 | 183 | 32:66 |
| 767 | 256 | 8:23 | 192 | 32:69 |
| 800 | 267 | 8:24 | 200 | 32:72 |
| 833 | 278 | 8:25 | 208 | 32:75 |
| 867 | 289 | 8:26 | 217 | 32:78 |
| 900 | 300 | 8:27 | 225 | 32:81 |
| 933 | 311 | 8:28 | 233 | 32:83 |
| 966 | 322 | 8:29 | 242 | 32:86 |
| 1000 | 333 | 8:30 | 250 | 32:89 |

TABLE 3

Ratio of Graphics and Memory Control Domain Operating Frequency to Bus Interface Clock (BLCK) at 66 MHz.

| Core frequency | GFX + MC @ Core/3 GFX & MCH frequency | BCLK @ 66 MHz cross over ratio | GFX + MC @ Core/4, GFX & MCH frequency | BCLK @ 66 MHz cross over ratio |
|---|---|---|---|---|
| 467 | 156 | 6:14 | 117 | 8:14 |
| 500 | 167 | 6:15 | 125 | 8:15 |
| 533 | 178 | 6:16 | 133 | 8:16 |
| 567 | 189 | 6:17 | 142 | 8:17 |
| 600 | 200 | 6:18 | 150 | 8:18 |
| 633 | 211 | 6:19 | 158 | 8:19 |
| 667 | 222 | 6:20 | 167 | 8:20 |
| 700 | 233 | 6:21 | 175 | 8:21 |
| 733 | 244 | 6:22 | 183 | 8:22 |
| 767 | 256 | 6:23 | 192 | 8:23 |

TABLE 3-continued

Ratio of Graphics and Memory Control Domain Operating Frequency to Bus Interface Clock (BLCK) at 66 MHz.

| Core frequency | GFX + MC @ Core/3 GFX & MCH frequency | BCLK @ 66 MHz cross over ratio | GFX + MC @ Core/4, GFX & MCH frequency | BCLK @ 66 MHz cross over ratio |
|---|---|---|---|---|
| 800 | 267 | 6:24 | 200 | 8:24 |
| 833 | 278 | 6:25 | 208 | 8:25 |
| 867 | 289 | 6:26 | 217 | 8:26 |
| 900 | 300 | 6:27 | 225 | 8:27 |
| 933 | 311 | 6:28 | 233 | 8:28 |
| 966 | 322 | 6:29 | 242 | 8:29 |
| 1000 | 333 | 6:30 | 250 | 8:30 |

As can be seen from the wide variety of ratios available in this embodiment, having multiple flexible domain cross-over circuits allows a relatively large number of internal frequencies to be chosen while still enabling the processor 300 to interact with the external interfaces that are limited to a few predetermined frequencies.

This flexibility may be highly advantageous due to inter-related product marketing and fabrication concerns. Typically, and integrated circuit product is introduced at a first frequency or performance level. As time goes on, efforts to fine tune internal circuitry and/or to improve the fabrication process leads to the ability to operate the overall integrated circuit at a higher frequency. Unfortunately, the external interfaces may be limited to a few frequency values. Therefore, unless a flexible domain interfacing approach is used, incremental gains in processing frequency may not be available. For example, in the above-described embodiment, frequency gains which move processor performance to 833 MHz from 800 MHz may be realized because the cross-over logic 330 allows both 9:24 and 9:25 ratios (for 400 MHz CTM) and the cross-over logic 335 allows both 6:24 and 6:27 ratios.

Additionally, the manufacturing process does not result in all parts operating identically. Some lots of semiconductor wafers turn out faster than others, and speed and other characteristics may differ not only from lot to lot, but also from wafer to wafer, and even chip to chip. As a result, not all parts perform identically. A highly flexible interface allows parts to be separated into larger numbers of different performance bins. Accordingly, the parts on average can be sold at higher performance levels since there is a finer granularity between the bins.

Figure 4:
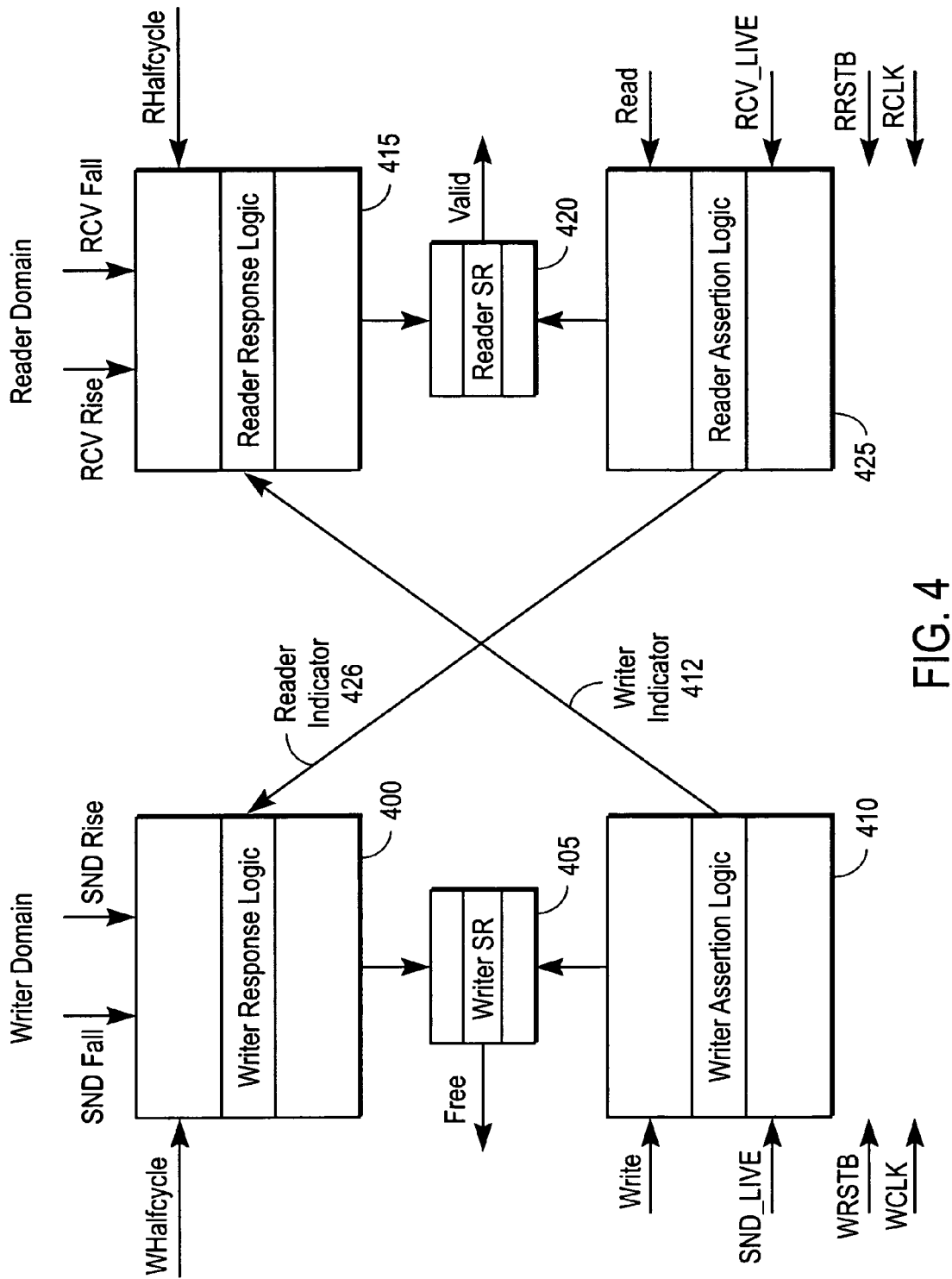
FIG. 4 illustrates one embodiment of assertion and response logic for a cross-over element.

FIG. 4 illustrates one embodiment of assertion and response logic which may be used in cross-over circuits such as those shown in FIGS. 2 and 3. The embodiment shown in FIG. 4 has a writer element in a writer domain and a reader element in a reader domain. The purpose of the reader and writer elements is to track, in respectively the reader and writer domains, the status of a latch element that holds data to be transferred from the writer to the reader. The writer element includes writer response logic 400, a writer set/reset latch 405, and writer assertion logic 410. The reader element includes reader response logic 415, a reader set/reset latch 420, and reader assertion logic 425. The writer element communicates with the reader element by toggling a writer indicator signal 412 which is received by the reader response logic. Similarly the reader element communicates with the writer element by toggling a reader indicator signal 426. Since the writer element operates in the writer frequency domain and the reader element operates in the reader frequency domain, the reader and writer indicator signals cross between the two frequency domains.

When the latch element tracked by the reader/writer pair is ready to accept data from the writer domain, the set/reset latch 405 so indicates by generating a free signal (FREE). When data is written into the latch element, a write signal (WRITE) is received by the writer assertion logic 410. In response, the writer assertion logic 410 toggles the writer indicator signal. If the writer indicator signal is unmasked (masking to be further discussed below), then the reader response logic 415 communicates that data is available in the latch element through the set/reset latch 420 which then asserts a valid signal (VALID).

When logic in the reader domain has received the data item from the latch element, a read signal (READ) is asserted to the reader assertion logic 425. The reader assertion logic 425 signals the set/reset latch 420, which deasserts the valid signal, and toggles the reader indicator signal. The writer response logic 400 responds when the reader indicator signal is unmasked by resetting the set/reset latch 405 to indicate that the latch element is now free to receive other data.

Figure 5:
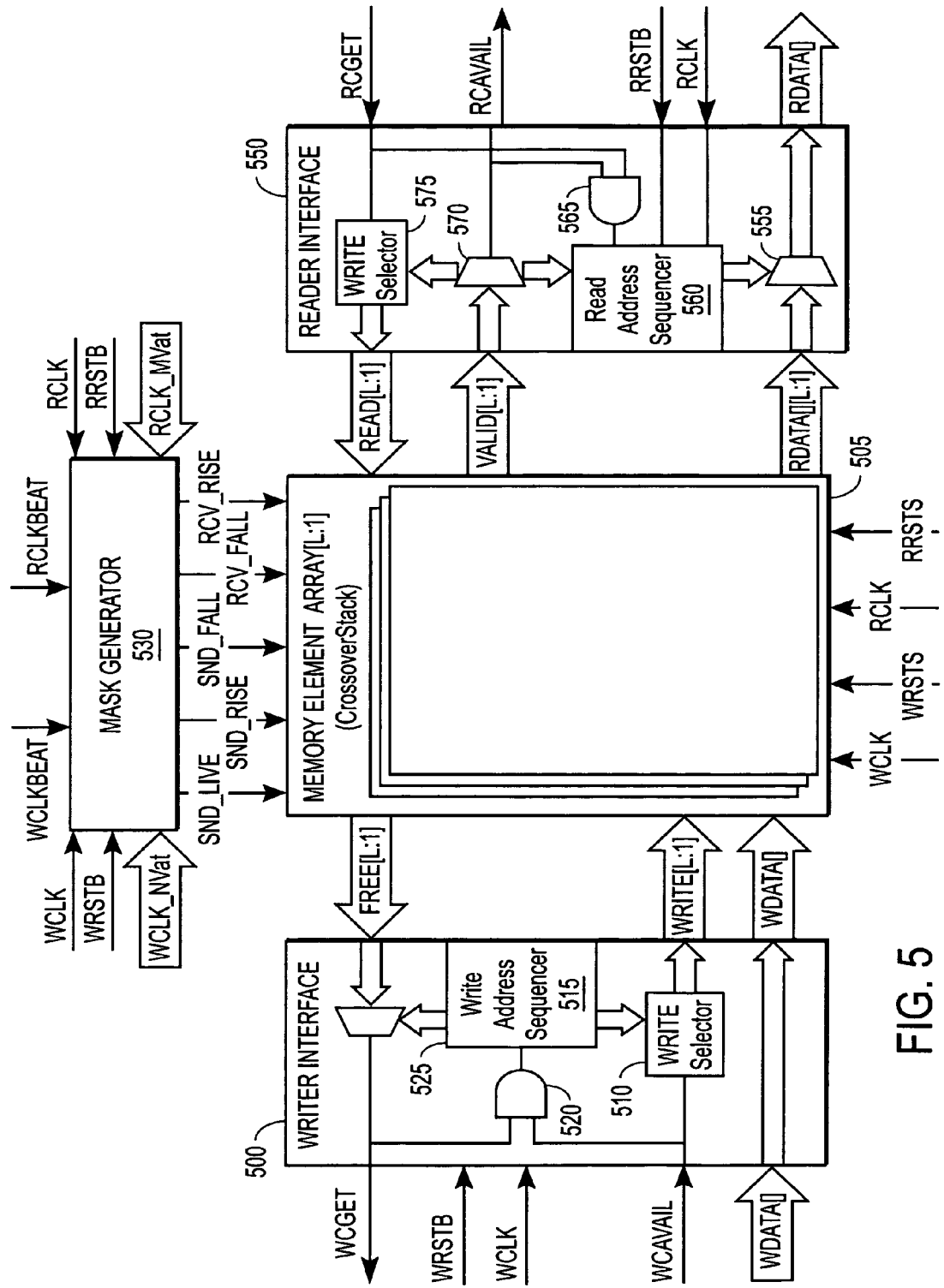
FIG. 5 illustrates additional details of one embodiment of a cross-over element.

The reader and writer elements may be duplicated to form an array of storage elements as shown by the memory element array or cross-over stack 505 in FIG. 5. The cross-over stack 505 allows a series of latches (not shown separately) to be arranged in a first-in-first-out (FIFO) cross-over array. Individual reader and writer elements (as shown in FIG. 4) may be used to track (in both domains) the status of data in each latch element in the cross-over array. In other words, for each latch in the cross-over FIFO, there is a reader/writer pair as shown in FIG. 4. Thus, the status of each latch entry is tracked in both domains. The reader and writer indicator signals provide cross-domain communication. In embodiments where groups of signals cross frequency domains, a single reader/writer pair may track the status of a group of latches for a bus or other group of signals which is transferred together.

As shown in FIG. 5, a writer interface 500 and a reader interface 550 interface the cross-over stack 505 to the reader and writer domains. Since the cross-over stack 505 is an array with multiple elements (e.g., arranged in a FIFO), the writer interface 500 includes a write address sequencer 515 to track which FIFO entry to store data in and which status bit to update. The write address sequencer is advanced when there is a free entry (WCGET) and there is write data available (WCAVAIL), as indicated by an AND gate 520, and a write strobe occurs.

Figure 6A:
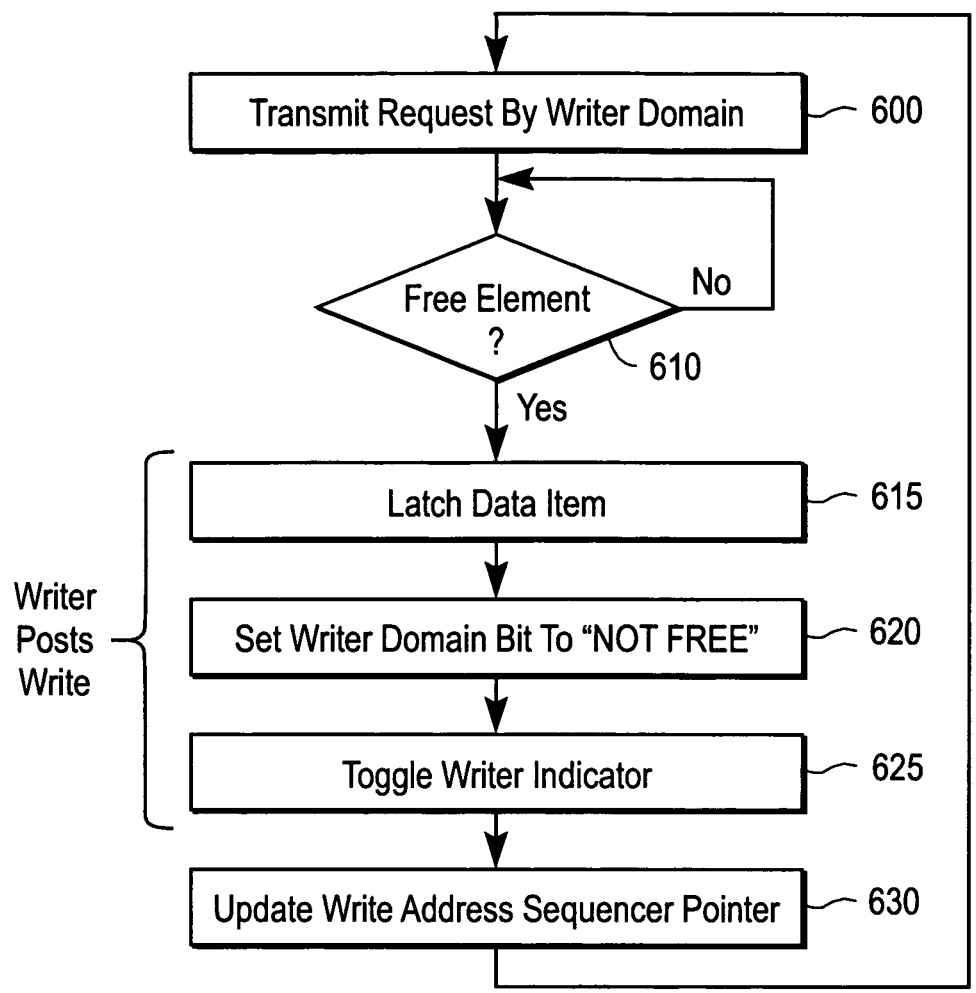
FIG. 6a illustrates a process performed by one embodiment of a writer element.

The operations undertaken by the writer domain logic in one embodiment are shown in FIG. 6*a*. When a write cycle is available from the writer domain, the request is transmitted as indicated in block 600. First, the writer domain logic asserts the WCAVAIL signal (FIG. 5). The write address sequencer 515 provides a pointer to the current open entry in the FIFO to a write selector 510. If there are no free latch elements in the FIFO, the data cannot be buffered by the cross-over logic and the logic remains waiting as indicated in block 610 until space is available.

If there is a free latch element, the writer interface logic writes to that latch as indicated in block 615. To write to the latch element, the write selector 510 asserts one of a set of write signals (WRITE) which is provided to the appropriate corresponding writer latch element. The writer assertion logic 410 communicates with the set/reset latch 405 to set the free bit to indicate that the latch is not free as indicated in block 620. Additionally, the write signal causes writer assertion logic 410 to toggle the writer indicator signal 412 which is communicated to the reader response logic 415 as indicated in block 625. The write address sequencer 515 also advances the write pointer after posting the write, as indicated in block 630.

Figure 7:
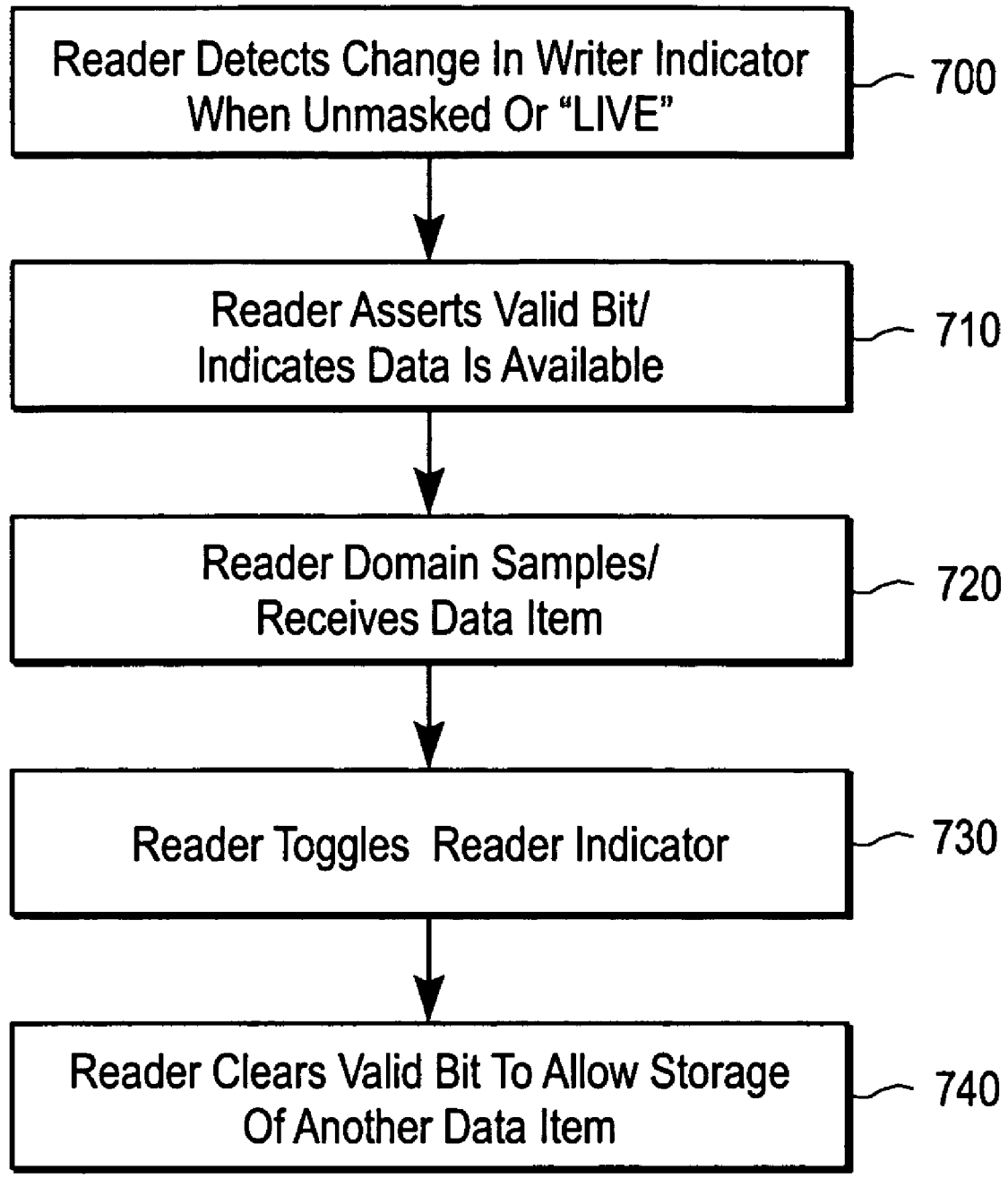
FIG. 7 illustrates a process performed by one embodiment of a reader element.

FIG. 7 details the reader element response for one embodiment. As indicated in block 700, the reader detects a change in the writer indicator signal when the writer indicator signal is unmasked or if it is sent "live" (i.e., if the writer assertion flip flop is bypassed). In some embodiments, a mere change of state in the indicator signal is used to signal across the frequency domain. In embodiments which use this technique, the actual logic value transmitted is unimportant. Advantageously, detecting only changes in logical value avoids sending pulses across frequency domains. Pulses are more error prone since a pulse may be either missed entirely or counted multiple times due to the different generation and sampling frequencies.

The reader response logic 415 communicates the change in the writer indicator signal to the set/reset latch 420 which in turn asserts a valid bit. If a read address sequencer 560 in the reader interface 550 points to the latch that was just written to, a selector 570 passes the newly set valid bit to the reader domain to signal the availability (RCAVAIL) of data as indicated in block 710. The read sequencer may alternatively point to a data item previously written by the writer but not yet read by the reader, in which case, a prior valid signal may be selected by the selector 570. The read address sequencer 560 also assures that a selector 555 provides the correct reader data (RDATA) to the reader domain.

Once the reader domain has received the data, as indicated in block 720, it signals to the reader interface 550 (via RRSTB) that the data has been read. A write selector 575 responsively passes a read signal (READ) to the reader assertion logic 425. The reader assertion logic 425 toggles the reader indicator signal as indicated in block 730. The reader assertion logic 425 also clears the valid bid in the set/reset latch 420 as indicated in block 740. The read address sequencer 560 operates in the reader frequency domain, as indicated by the RCLK signal coupled thereto.

Upon the reading of the data (RRSTB asserted), the read address sequencer moves its pointer to the next FIFO entry in the next clock cycle. The read address sequencer is advanced when a read strobe (RRSTB) occurs and the reader can receive data (RCGET) and the data is available (RCAVAIL), as indicated by an AND gate 565. Accordingly, the reader domain logic independently consumes data from the FIFO array at a rate independent of the writer domain (assuming there is data available). The writer domain fills the FIFO using its own write address sequencer 515. Thus, a sustained rate determined by the slower of the writer and reader may be obtained. Moreover, the FIFO depth can be adjusted in order to improve performance based on expected utilization.

Figure 6B:
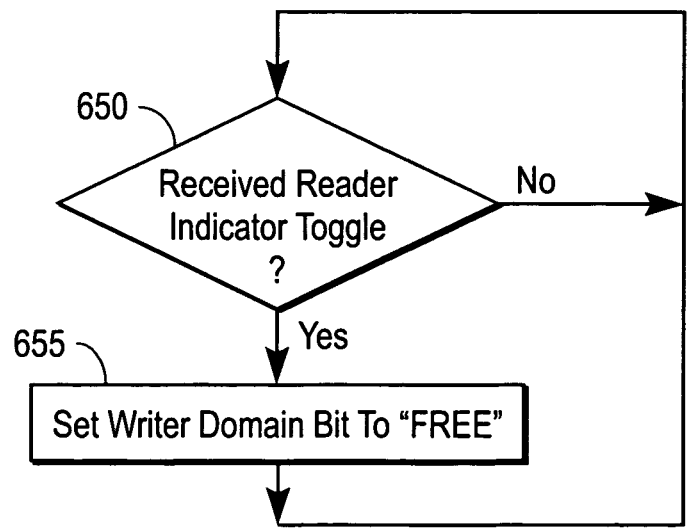
FIG. 6b illustrates another process performed by one embodiment of writer element.

Referring to FIG. 6*b*, the operations of one embodiment of the writer domain logic when receiving the reader indicator signal are shown. In particular, the writer response logic 400 (FIG. 4) may perform the operations of FIG. 6*a*. If a change in the state of the reader indicator signal is detected in block 650, then the writer response logic 400 sets the writer domain bit stored by the set/reset latch 405 to indicate that the FIFO entry is free (block 655). Accordingly, when the write address sequencer 515 again reaches this entry, the writer domain will be allowed to write new data into the FIFO.

Figure 8:
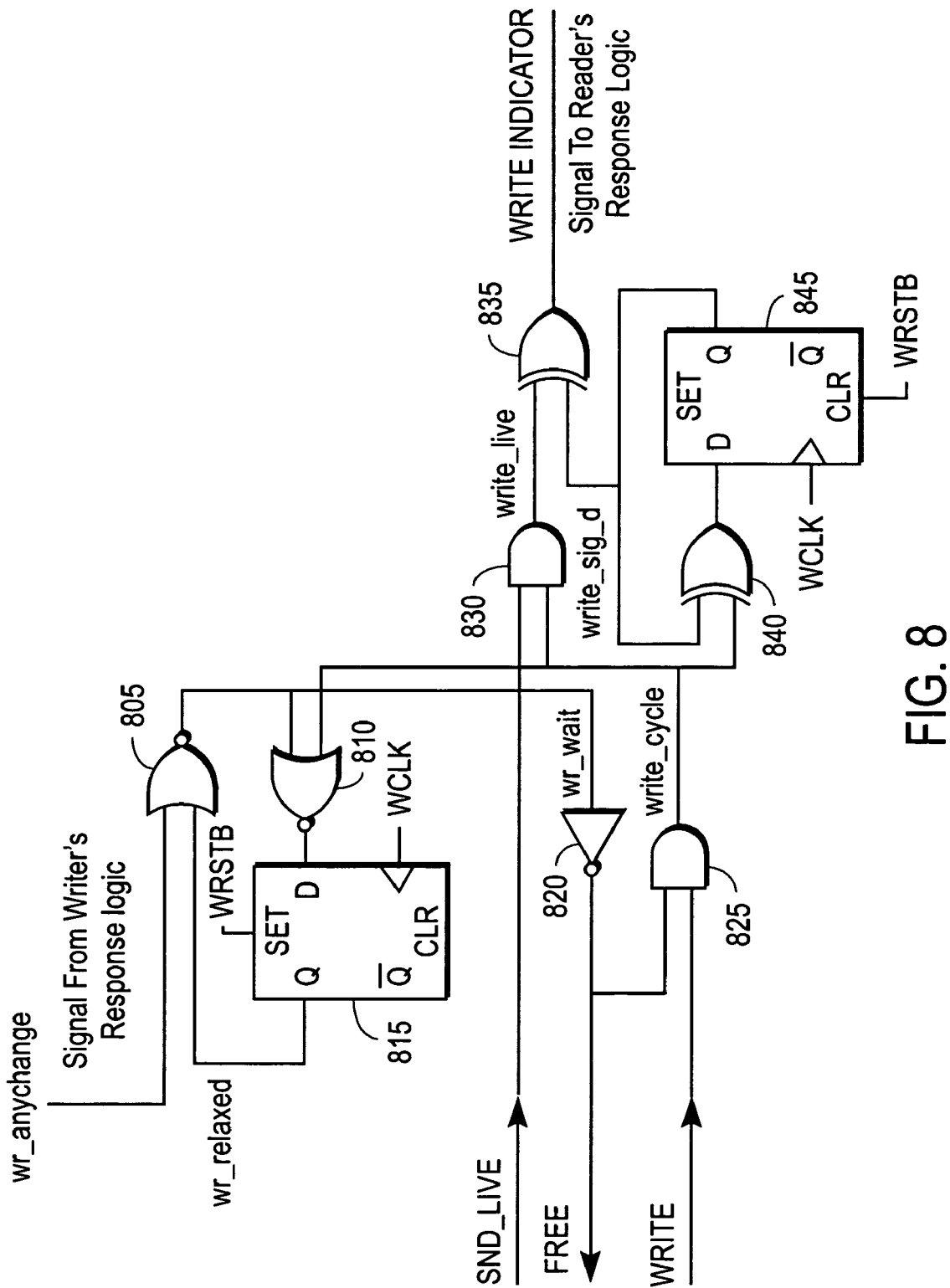
FIG. 8 illustrates one embodiment of the assertion logic and a set/reset latch of a writer element.

One embodiment of the assertion logic and set/reset latch for a writer element is shown in FIG. 8. In this embodiment, a wr_anychange signal indicates when the writer response logic has detected a change in state of the reader indicator signal from the reader. A NOR gate 805 combines the wr_anychange signal with the output of a latch 815. The output of the NOR gate 805 is inverted by an inverter 820 to generate the free signal (FREE) that indicates whether the latch element being tracked is free to accept data.

The latch 815 has a set input which is connected to WRSTB, thereby setting the latch when a write occurs to store data in the latch element being tracked. The latch 815 is clocked by the writer domain clock signal WCLK. The data input of the latch 815 is coupled to receive the output of a NOR gate 810. The NOR gate 810 has one input coupled to receive the output of the NOR gate 805 and one input coupled to receive a write_cycle signal. The write_cycle signal is generated by an AND gate 825 having a first input that receives the free signal and a second input that receives the write signal (WRITE). Thus, write_cycle is asserted if the data latch element is available and a write cycle is being presented.

An exclusive-OR gate 840 is coupled to receive the write_cycle signal and the output of a latch 845 (write_sig_d). The output of the exclusive-OR gate 840 is coupled to the data input of the latch 845. The latch 845 is clocked by WCLK and cleared by WRSTB. A second exclusive-OR gate 835 has a first input coupled to the output of the latch 845 and a second input coupled to receive a write_live signal generated by an AND gate 830. Thus, the writer assertion logic generates a transition (may be a 1-to-0 or 0-to-1 transition) on the write indicator either when either a WRITE is clocked in to the latches or immediately when a WRITE is received and the send live (SND_LIVE) signal is active. The send live signal indicates that there is sufficient propagation time to meet the setup of latches in the receiving domain and therefore allows bypassing of the writer assertion logic indicator generating flip flop.

Figure 9:
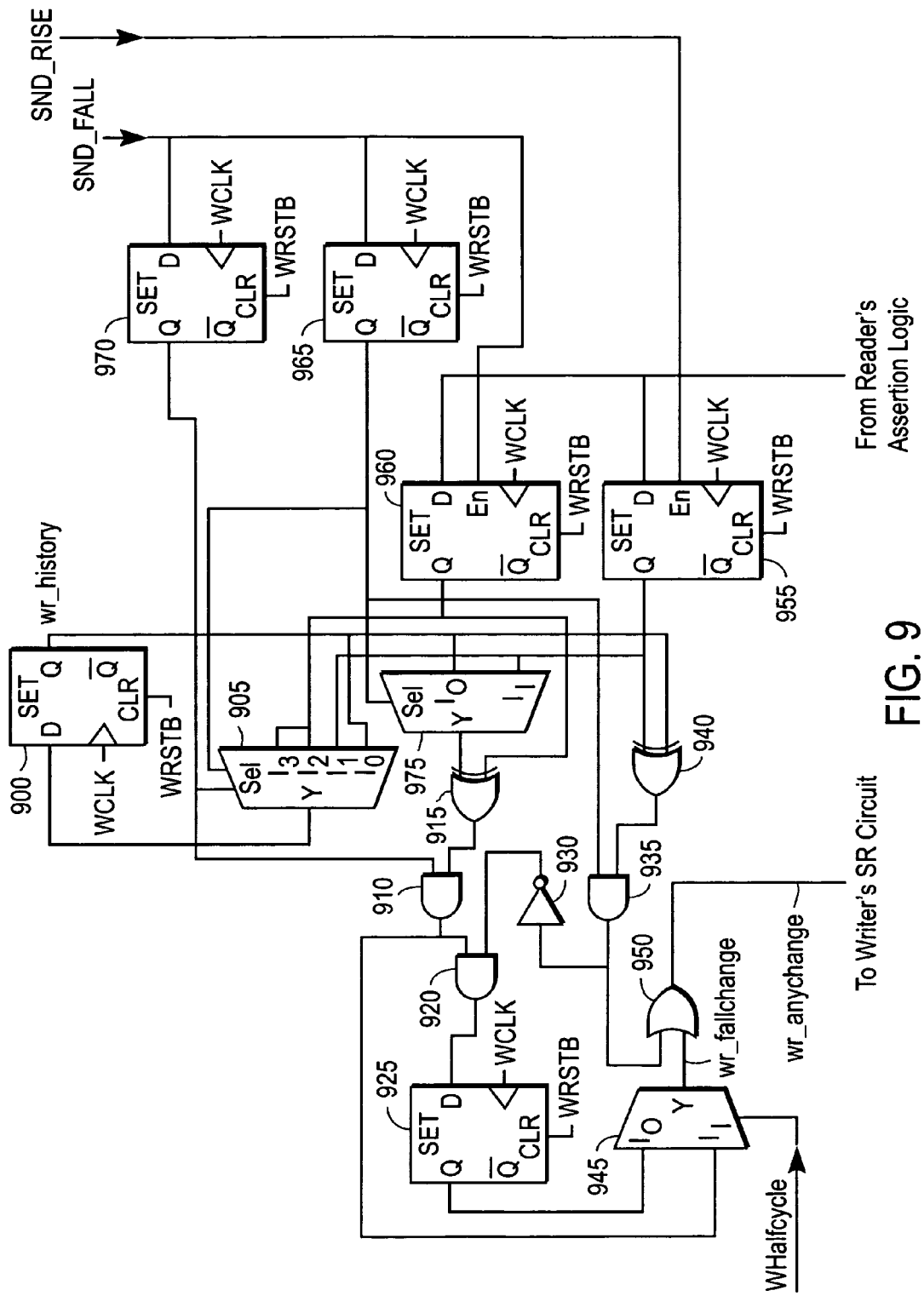
FIG. 9 illustrates one embodiment of the response logic of a writer element.

FIG. 9 illustrates one embodiment of writer response logic. The writer response circuit in FIG. 9 ultimately generates the wr_anychange signal which is supplied to the writer set/reset circuit. An OR gate 950 generates the wr_anychange signal from a wr_fallchange signal and a wr_risechange signal. The wr_fallchange signal indicates that a change in the reader indicator signal has been detected at a falling edge of the writer domain clock (WCLK). Similarly, the wr_risechange signal indicates that a change in the reader indicator signal has been detected at a rising edge of WCLK.

The wr_fallchange signal is generated by a multiplexer 945. The multiplexer 945 selects from either the output of an AND gate 910 or a latch 925. The latch 925 is clocked by WCLK and reset by the a write strobe (WRSTB) if data is written to the corresponding FIFO latch. The latch 925 receives data at its input from an AND gate 920. The AND gate 920 has a first input coupled to receive wr_risechange after being inverted by an inverter 930 and a second input coupled to the output of the AND gate 910. The AND gate 910 has a first input coupled to an output of a latch 970 and a second input coupled to the output of an exclusive-OR gate 915.

The exclusive-OR gate 915 has its first input coupled to the output of a multiplexer 975. The multiplexer 975 has a first input coupled to a wr_history signal which is output by a latch 900. The second input of the multiplexer 975 is coupled to an output of a latch 955. The output of a latch 965 is the control input for the multiplexer 975.

The latch 900 receives its data input from a four input multiplexer 905 and has the WCLK and WSTRB signal respectively connected to its clock and clear inputs. The multiplexer 905 has two inputs coupled to the output of a latch 960. The third input of the multiplexer 905 is coupled to the output of the latch 955. The fourth input of the multiplexer 905 is coupled to the output of the latch 900 (wr_history). The latch 970 has the SND_FALL signal as its data input, the WCLK signal as its clock input, and the WRSTB signal as a clear input. Similarly, the latch 965 has the SND_RISE signal as its data input, the WCLK signal as its clock input and the WRSTB signal as its clear input. The latches 960 and 955 receive as their data inputs the reader indicator signal from the reader assertion logic. Each has the WCLK signal as its clock and the WRSTB signal as a clear input. The output of the latch 955 is connected to an exclusive-OR gate 940, which combines the latch output with the wr_history signal, the output of the latch 900. An AND gate 935 combines the output of the exclusive-OR gate 940 with the output of the latch 965 to generate the wr_risechange signal.

The SND_RISE and SND_FALL signals are masks which indicate whether the logic is permitted to observe an indicator signal from the other domain during a particular cycle for both the rising edge sample and the falling edge sample. Having both of these half cycles available increases the number of possible edges which capture the indicator signal from the opposite domain. Depending on the timing constraints on the cross-over logic, sampling on one of the edges may be disabled.

When permitted to make observations by the mask signals, the writer response logic compares the state of the reader indicator signal with the value at the last sample. A change in state of the reader indicator signal indicates that the reader domain has signaled consumption of a data item. The wr_anychange signal clears the set/reset latch (see FIG. 8), indicating that the FIFO element is now free. The last sampled value is stored at the end of the writer domain clock cycle for comparison during the next cycle. If both edges are able to observe changes in the reader indicator signal during a particular clock, the falling edge sample is stored, since it is the most recent.

The multiplexer 945 is controlled by a write half cycle signal (WHalfcyc). The write half cycle signal indicates (by selecting the input from AND gate 910) that there is sufficient time available to allow wr_anychange to be sampled at the half-cycle point. If WHalfcyc is asserted to allow samples to be detected on the falling edge, only one half cycle may be available to propagate wr_anychange to the set/reset latch and to any other receiving logic. WHalfcyc may be a controlled by a static configuration bit to allow the same cross-over logic to used in situations whether or not the half cycle option is feasible.

Reader assertion and response logic may be designed similarly to the writer assertion and response element as these element are alike in function. The free bit in the writer domain is replaced by the valid bit in the reader domain (an inversion may be desirable). As is true with the WHalfcyc signal (and consequently also true of the symmetric RHalfcyc signal), some of the features of the cross-over logic may not be needed in some situations. One of skill in the art will recognize that the disclosed invention may be practiced with a subset of features as desired for a particular clock domain crossing situation.

As shown in FIGS. 5 and 9, various mask signals such as SND_RISE and SND_FALL as well as "live" signals may be used to facilitate domain crossings in some embodiments. In FIG. 5, a mask generator 530 is shown generating the SND_LIVE, SND_RISE, SND_FALL, RCV_FALL, and RCV_RISE signals. Due to the symmetry of the SND and RCV signals, only the send signals are further discussed. The "live" mask looks forward and allows signals to pass directly to the other domain without passing through the assertion logic flip flop if there is sufficient time from the current edge to the next edge in the other domain. The data is thus passed "live" if there is sufficient time to send meet the setup to the receiving latches in the other domain.

The normal masks (SND/RCV_RISE/FALL) look backward and are based on the distance to the previous edge in the other domain. That is, rising normal masks look backward from the rising edge for the detection logic and determine if there is sufficient setup from the rising edge of the other clock domain. Similarly, normal falling masks look backward from the rising edge for the detection logic and determine if there is sufficient setup from the falling edge of the other clock domain.

The mask generator 530 generates masks with on-the-fly calculations to digitally measure the nominal edge-to-edge spacing. The term "on-the-fly" is used here to refer to calculations performed while the mask generator is operating, as opposed to calculations performed in the design phase of the circuit which are incorporated or hard-coded into logic. To perform these on-the-fly calculations, the mask generator 530 receives the n and m values that define the n:m cross-over frequency ratio (WCLK_Nval and RCLK_Mval). Additionally, the mask generator 530 receives the clocks (RCLK and WCLK) and the read and write strobes (WRSTB and RRSTB, which function as reset signals) as well as a beat indicator that indicates points of alignment between the two clock domains. The beat indicator may be used to periodically align all mask signals.

A unit of a tick, which is shorter in time than any of the clock cycles involved, is used to perform calculations to evaluate edge-to-edge spacing. Using on-the-fly calculations allows much more flexibility than prior art solutions which only support a few predetermined ratios with dedicated mask or clock configurations for each different ratio. The tick specifies the minimum resolution of the system, and in one embodiment may be the period of the central processor divided by twenty-four (giving a tick range of 41–89 picoseconds for one embodiment).

Figure 10:
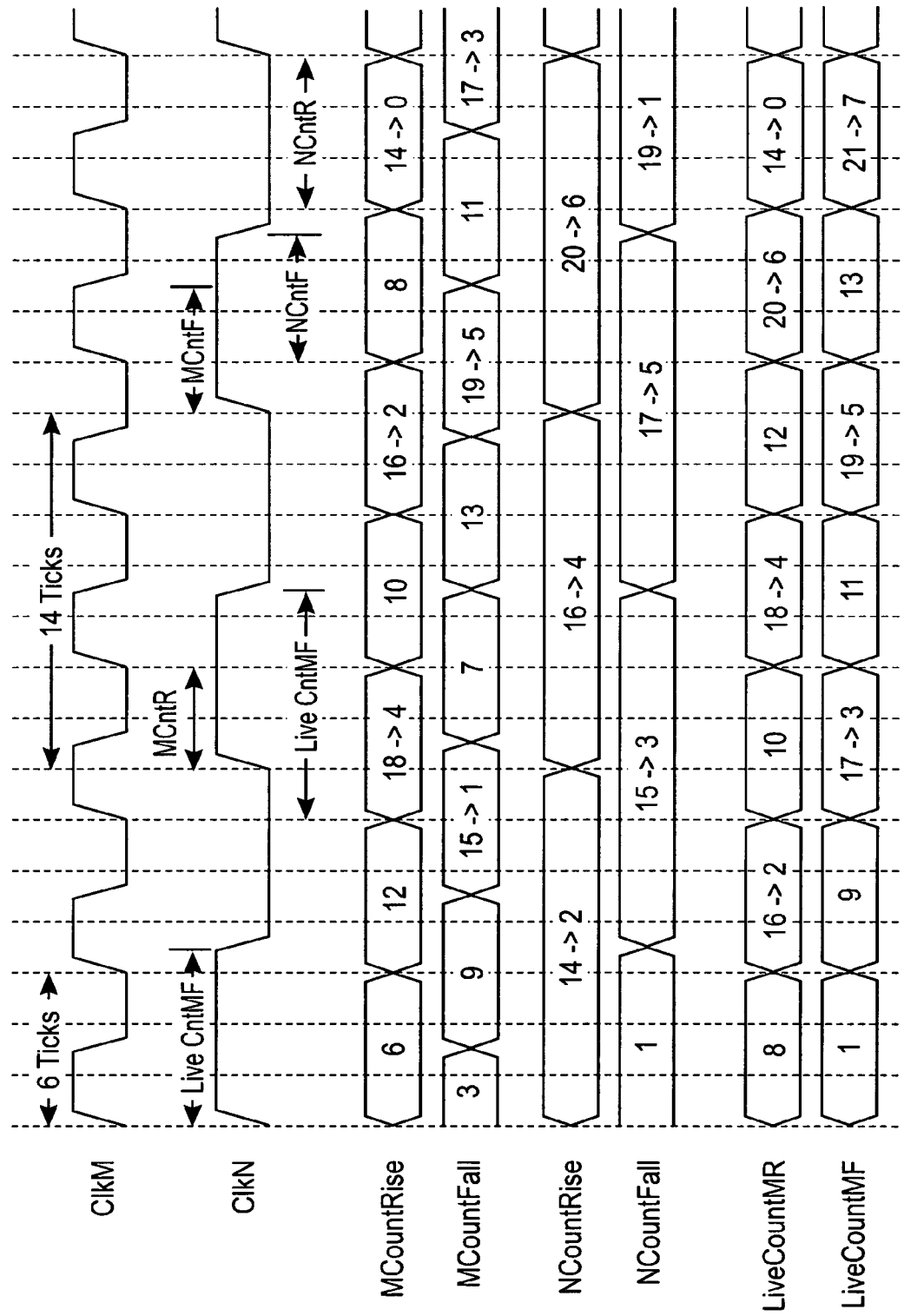
FIG. 10 illustrates various clocking signals as used to generate mask and live signals for one embodiment in a particular clocking ratio of n:m equal to 6:14.

FIG. 10 illustrates an example to explain the edge spacing calculations. In FIG. 10, clocks with a 14:6 ratio are shown. In terms of the generic units (ticks), consider the period of ClkM to be six ticks and ClkN to be 14 ticks. The actual period of time or length of a tick is not critical. For each cycle of ClkM, 6 ticks have passed, and for each cycle of ClkN, 14 ticks have passed. Starting from a point where both clocks are aligned (determined by the WCLKBEAT and RCLKBEAT signals), it is possible for logic in one domain to track the position of the edges of the other clock by simply counting the number of ticks from the aligned edge and comparing that with the period of the other clock.

For example, MCountRise indicates the spacing, in terms of ticks, from the ClkM rising edge at the end of the cycle to the closest ClkN edge before that particular point in time. During the first cycle of ClkM, MCountRise indicates 6, meaning that on the rising ClkM edge after the aligned edge, the closest previous ClkN edge is 6 ticks away. This closest edge happens to be the aligned edge in this cycle. MCountRise increases in increments of the period of ClkM (6 ticks). When MCountRise exceeds the value of the period of ClkN (14 ticks), MCountRise rolls over, taking the value it counted and replacing it with the remainder value after an integer division by the period of ClkN. This is shown in the third cycle where MountRise has counted to 18 but is reduced to 4, which is the remainder after the division of 18 by 14.

Analogous techniques are used to generate MCountFall, NCountRise, and NCountFall. MCountFall indicates the distance from a ClkM falling edge to the closest previous rising edge of ClkN. The falling measurement operates like the rising measurement except that different initial conditions are loaded into the counter to reflect the half cycle offset. NCountRise and NCountFall are computed in the same manner as MCountRise and MCountFall. Additionally, the operation of the mask generation logic for other m:n frequency ratios may be performed in a like manner by changing the base m and n counts that are used.

The live counters track how close the next rising or falling edge of ClkN is from the rising edge of ClkM that starts the cycle (see Live CntMF as noted on the ClkN waveform). The live rise and fall counters operate on the same principle, but they count with a value of the difference of the periods. The live counters also roll over when they reach the ClkN period in the same manner as the MCountRise and MCountFall counters.

The counters give a measurement with which to determine the duration between clock edges in any given period. The masks themselves are generated by comparing the value measured for the edge to edge spacing against a predetermined threshold. The threshold represents a value below which setup time may be violated when sending an indicator signal from the assertion logic to the response logic within a cross-over element. A programmable register, hard coded logic, or other structure may be used to indicate the predetermined threshold. Using these techniques, masks and "live" signals may be provided for any m:n frequency ratio.

Thus, a method and apparatus for an integrated circuit having flexible-ratio frequency domain cross-overs is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An integrated circuit comprising:
   at least three cooperating frequency domains having variable operating frequencies, wherein the at least three domains each operate at different frequencies;
   cross-over logic to allow integral fractional ration frequency domain cross-overs between more than one pair of frequency domains; and
   a mask generator circuit to compute and generate masking signals for said cross-over logic on-the-fly using selectable cross-over ratios.

2. The integrated circuit of claim 1 wherein said cross-over logic is
   capable of providing at least sixteen different cross-over ratios.

3. The integrated circuit of claim 1 wherein said at least three cooperating frequency domains comprise:
   a processor domain operable at a relatively large number of different frequencies;
   a memory control domain;
   a memory interface domain operable at a first relatively small number of frequencies, said first relatively small number being less than one-half of the relatively large number;

a bus interface domain operable at a second relatively small number of frequencies, said second relatively small number also being less than one-half the relatively large number.

4. A system comprising:

an integrated circuit comprising:

a CPU portion to operate at a selectable first frequency which is one of a first plurality of frequencies, said first plurality of frequencies being equal to a base frequency plus between zero and N times an incremental frequency;

a graphics portion to operate at a second frequency which is a function of the selectable first frequency;

a memory control portion to operate at said second frequency;

a memory interface portion to operate at a third frequency;

a bus interface portion to operate at a fourth frequency;

programmable cross-over logic to interface said bus interface portion and said memory interface portion to said memory control portion at selectable integral fractional clocking ratios;

a memory subsystem to communicate with said memory interface portion, wherein each portion operates at a different frequency; and mask generation circuitry to compute and generate mask signals for said programmable cross-over logic.

5. An integrated circuit comprising:

a first portion operable at a first plurality of frequencies, said first portion to operate in a first frequency domain;

a second portion operable at a second plurality of frequencies that are a ratio n/m to said first portion, said second portion to operate in a second frequency domain;

cross-over logic between said first portion and said second portion, said cross-over logic comprising:

a plurality of latches arranged as a FIFO array;

a plurality of status bits comprising:

a plurality of free bits;

a plurality of valid bits;

a writer element to maintain a write pointer to said FIFO array in said first frequency domain;

a reader element to maintain a read pointer to said FIFO array in said second frequency domain;

domain crossing handshake circuitry to update said plurality of free bits and said plurality of valid bits;

a third portion operable at a third plurality of frequencies, said third portion to operate in a third frequency domain, wherein the first, second and third portions each operate at different frequencies; and mask generation circuitry to compute and generate mask signals for said cross-over logic.

6. The integrated circuit of claim 5 wherein said domain crossing handshake circuitry comprises:

writer assertion logic to toggle a writer indicator signal to either a first or a second logic value to indicate available write data;

reader response logic to receive said writer indicator signal and to indicate that valid data is available responsive to the writer indicator signal toggling to either the first or the second logic value;

reader assertion logic to toggle a reader indicator signal to either the first or the second logic value to indicate that a data item has been used;

writer response logic to receive said reader indicator signal and to indicate that a free FIFO entry is available responsive to the reader indicator signal toggling to either the first or the second logic value.

* * * * *